US005797569A

United States Patent [19]

Simons

[11] Patent Number: 5,797,569

[45] Date of Patent: Aug. 25, 1998

[54] APPARATUS FOR CLAMPING A MUSICAL INSTRUMENT

[75] Inventor: Richard Simons, Pomona, N.Y.

[73] Assignee: Latin Percussion, Inc., Garfield, N.J.

[21] Appl. No.: 504,904

[22] Filed: Jul. 20, 1995

[51] Int. Cl.$^6$ .......... F16M 11/04

[52] U.S. Cl. .......... 248/187.1; 248/121; 84/421

[58] Field of Search .......... 248/121, 187.1, 248/74.3, 230.8, 228.8, 505; 84/421

[56] References Cited

U.S. PATENT DOCUMENTS

| | | | |
|---|---|---|---|
| 689,434 | 12/1901 | Theobald | 248/228.8 |
| 1,329,816 | 2/1920 | Winslow | 248/558 |
| 1,819,768 | 8/1931 | Coffing | 248/230.8 |
| 2,482,575 | 9/1949 | Cohn | 248/228.8 |
| 4,381,621 | 5/1983 | Eby | 248/121 |
| 5,202,527 | 4/1993 | Gracie | 84/327 |
| 5,362,024 | 11/1994 | Grinnen | 248/524 |

OTHER PUBLICATIONS

Portions of pp. 26 and 27 from a Latin Percussion, Inc. Merchandise Catalog entitled "The Complete Percussion Catalog".

*Primary Examiner*—Ramon O. Ramirez
*Assistant Examiner*—Gwendolyn W. Baxter
*Attorney, Agent, or Firm*—Ohlandt, Greeley, Ruggiero & Perle

[57] ABSTRACT

Disclosed is an apparatus for clamping a musical instrument which has a generally rectangular cross-section mounting member. The apparatus includes a metallic post, and an L-shaped receiving member. The receiving member has a first arm which is substantially parallel with the axis of the post and a second arm which is substantially perpendicular to the axis of the post. The second arm is rigidly attached to the metallic post. The apparatus also includes a flange which extends outward from the first arm and which has a bore therethrough. The apparatus further includes a strap which has a hook at one end and a tensioning screw at a second end. The hook is arranged to engage the metallic post, and the mounting member can be received in the receiving member and clamped therein by the strap.

13 Claims, 4 Drawing Sheets

APPARATUS FOR CLAMPING A MUSICAL INSTRUMENT

FIELD OF THE INVENTION

The invention relates to an apparatus for clamping a musical instrument to a stand. Specifically, the invention relates to a clamp for a bongo stand which firmly holds a pair of bongo drums and prevents undesired rotational movement of the drums during play.

BACKGROUND OF THE INVENTION

A bongo drum set typically comprises a pair of bongos and a center block, wherein the pair of bongos are rigidly secured to the center block. Because bongos are typically played in conjunction with other musical instruments, it is desirable to secure the pair of bongos on a stand or post which lies in close proximity with other instruments. It is also desirable to secure the pair of bongos to the stand via the center block so that the mounting does not affect the tonal quality and so they do not move when being played.

One known clamp stand comprises a post having a U-shaped receiving member at a first end thereof. The receiving member has a first wall and a second wall. The first wall of the receiving member includes a threaded bore for receiving a screw. One end of the screw has a felt covered washer which engages the center block for securing the center block adjacent to the second wall of the U-shaped receiving member. To secure the drum set, the center block is positioned within the U-shaped receiving member, adjacent to the second wall. The screw is then tightened until the felt covered washer engages the center block, thereby forcing the center block against the second wall of the U-shaped receiving member. The screw is then further tightened for securing the center block within the U-shaped receiving member.

A second known clamp stand comprises a post having an L-shaped receiving member at one end thereof. A vertical leg of the L includes a bore for receiving a screw having an enlarged head. The center block of the drum set also has a bore for receiving the screw. The head of the screw is larger than the bore in the center block and this prevents the screw from passing completely through the center block. After the screw has passed through the bores in both the center block and the vertical wall, a wing nut is then secured to the other end of the screw and it is tightened to secure the center block to the stand.

These two designs do not adequately secure a pair of bongos, however, because in normal playing the pair of bongos are hit in an alternating manner creating a rotational movement of the drums. The center of rotation of the drums is the center block between the drums. This is also the place of clamping with the axis of clamping coincident with the axis of rotation. Because there is no clamping force perpendicular to the axis of rotation, the pair of bongos have a tendency to rotate out of the clamp and only brute clamping force is available to resist this.

An unsuccessful effort to solve these problems has been attempted by modifying the first means discussed above. In this modification the felt covered washer has been replaced by a larger felt covered plate which engages the center block. The larger area of the plate provides greater anti-rotational force than is provided by the smaller washer. In addition, two or more stabilizing pins are used to prevent rotation of the plate. This modification has also proven to be ineffective, however, because the stabilizing forces are overcome by the rotational forces generated by the playing of the bongos.

Another device used to secure a pair of bongos to a playing stand is a quick release bongo accessory bracket produced by Latin Percussion, Inc. of Garfield, N.J. The bracket has two forked prongs, each of which is inserted inside the bottom opening of a respective bongo shell in order to secure the pair of bongos to the playing stand. The design of the bracket enables one to quickly remove the bongos from the stand for "between the legs" playing. The quick release bracket has solved many of the problems identified above; however, the bracket is expensive to produce, requires additional hardware to be connected to the bongos, and requires minor disassembly of the bongos before the bongos can be properly connected and disconnected from the bracket.

Thus, there exists a need for a more effective and economical bongo clamping apparatus which provides: stronger clamping forces to prevent unwanted movement of the bongos during playing; which enables the user to quickly and easily connect and disconnect the bongos from the stand; which does not require additional hardware to be attached to the bongos; and which fits a large variety of drums.

SUMMARY OF THE INVENTION

The object of the present invention, then, is to provide an apparatus for securing a musical instrument. The apparatus enables one to secure a musical instrument at a desired location and prevent unwanted movement of the instrument during playing.

A second object of the present invention is to provide an apparatus for preventing unwanted rotational movement of a pair of bongos when they are being played.

Another object of the present invention is to provide an easy-to-use clamping device for a musical instrument.

A further object of the present invention is to provide an economical clamping device for a musical instrument.

The present invention discloses an apparatus for clamping a musical instrument having a generally rectangular cross-section mounting member. The clamping apparatus includes: a metallic post, an L-shaped receiving member having a first arm substantially parallel with the axis of the post and a second arm substantially perpendicular to the axis of the post. The second arm is rigidly attached to the post.

Rubber sheeting is disposed on the interior angle side of the L-shaped receiving member to add friction to the engagement of the apparatus and the musical instrument. The added friction prevents slippage of the musical instrument.

The apparatus also includes a flange which extends outward from the first arm. The flange has a bore therethrough, and the flange is substantially parallel to the second arm. The first arm also has a first guide member and a second guide member mounted on the same side of the flange for supporting the flange and stiffening the first arm. The guide members further include a first outer edge and a second outer edge for guiding a portion of the tensioning screw.

The apparatus also has a strap which has a hook at one end and a tensioning screw at a second end. The hook is arranged to engage a slot in the metallic post.

The apparatus further includes a wing nut which is rotated about the tensioning screw for clamping the mounting member onto the receiving member. The tension in the strap can be varied by rotating the wing nut. In another embodiment, a cam-lock is substituted for the wing nut. The cam-lock includes a screw for modifying the strap tension once the cam-lock is placed in a locked position. During a clamping operation, the mounting member can be received in the receiving member and clamped therein by the strap. The cam handle pivots around a cam axis to tension the strap.

In sum, the use of the strap in conjunction with the L-shaped receiving member enables one to better secure the mounting member to the receiving member. The positioning of the strap over the mounting member enables one to apply force so that the mounting member is pulled against the L-shaped receiving member. This arrangement allows extensive force to be applied perpendicular to the probable axis of rotation of the mounting member. This prevents unwanted rotation of the pair of bongos.

DETAILED DESCRIPTION OF THE PREFERRED EMBODIMENTS

The invention will be described in detail with reference to FIGS. 1–10.

Figure 1:
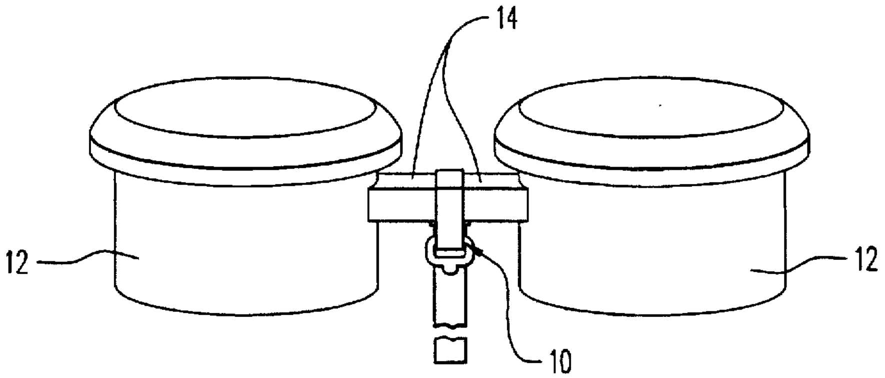
FIG. 1 shows a front view of a pair of bongos secured using a clamping apparatus according to the present invention.

FIGS. 1 shows an apparatus 10 for clamping a musical instrument 12 having a generally rectangular cross-section mounting member 14.

Figure 2:
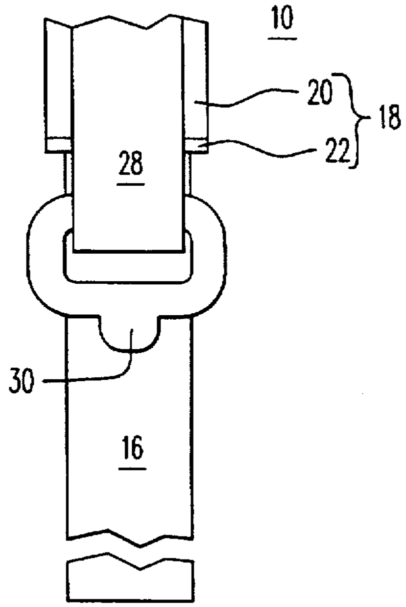
FIG. 2 is a partial front elevational view of a clamping apparatus according to the present invention.
Figure 3:
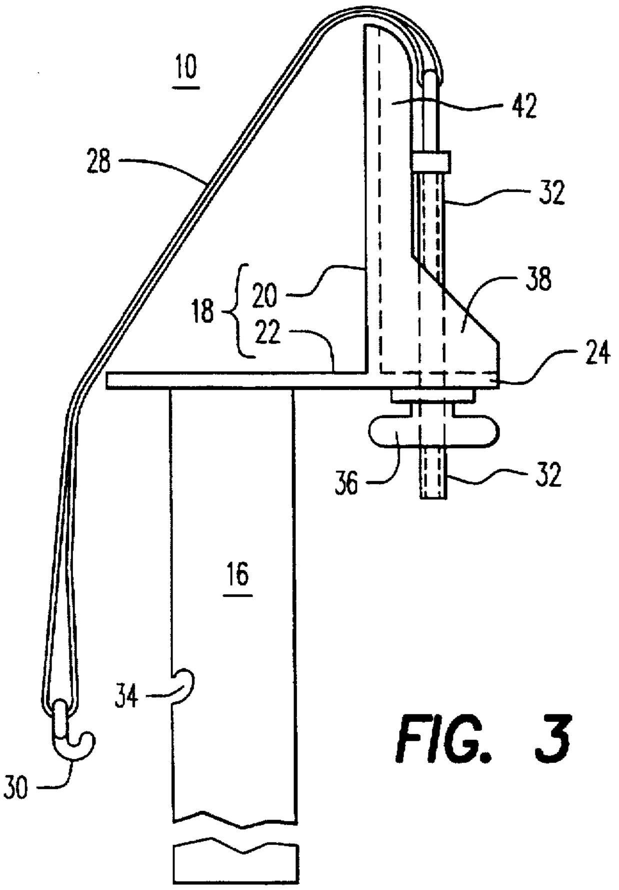
FIG. 3 shows a side elevational view of a clamping apparatus according to the present invention.
Figure 4:
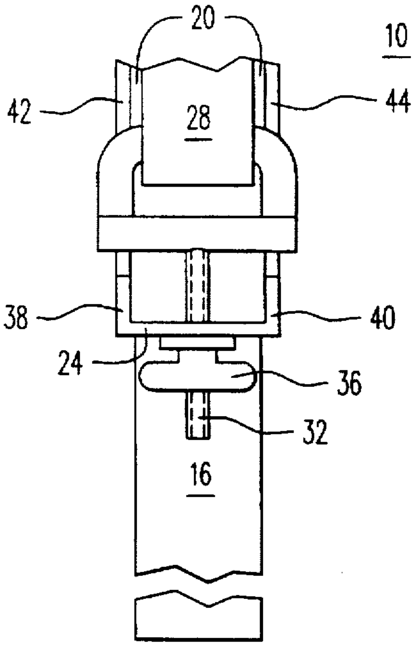
FIG. 4 shows a partial rear elevational view of a clamping apparatus according to the present invention.

FIGS. 2–4 show the clamping apparatus 10, comprising: a metallic post 16, an L-shaped receiving member 18 having a first arm 20 substantially parallel with the axis of the post 16 and a second arm 22 substantially perpendicular to the axis of the post 16, the second arm 22 being rigidly attached to the metallic post 16. The first and second arms 20, 22 have inwardly facing receiving surfaces which intersect at a right angle to form the L-shaped receiving member 18.

Figure 9:
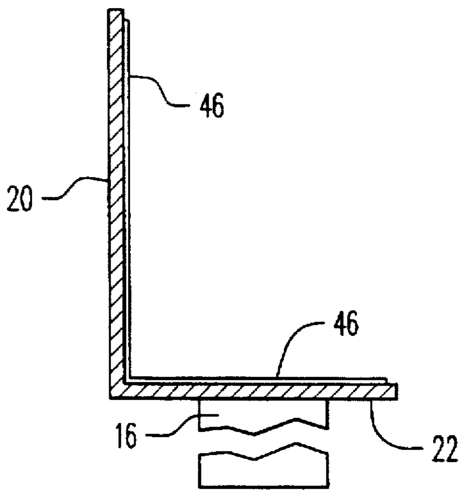
FIG. 9 shows a partial side view of the inventive apparatus.

As shown in FIG. 9, rubber sheeting 46 is disposed on the interior angle side of the L-shaped receiving member 18. Specifically, it is disposed on the first arm 20 and the second arm 22. The rubber sheeting 46 improves frictional engagement between the apparatus 10 and the musical instrument 12, thereby preventing slippage.

Figure 5:
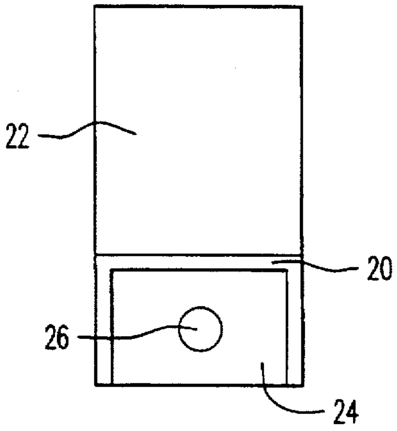
FIG. 5 shows a top view of the clamping apparatus according to the present invention with the strap removed.

Referring to FIGS. 3 and 5, a flange 24 extends outward from the first arm 20. The flange 24 has a bore 26 therethrough, and the flange 24 is substantially parallel to the second arm 22.

Figure 6:
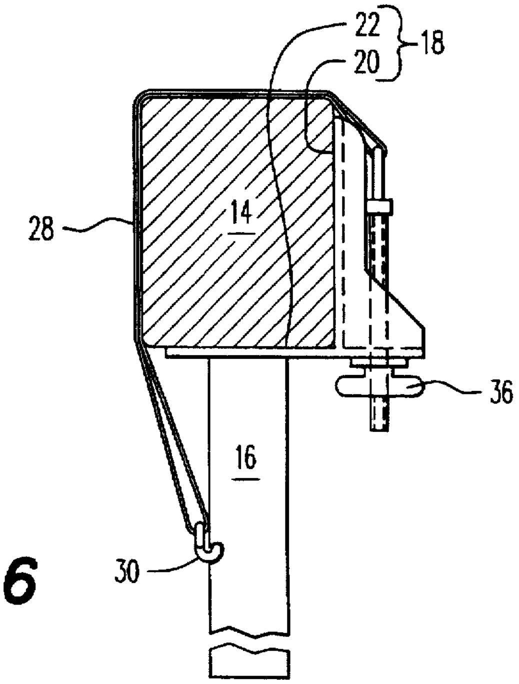
FIG. 6 is a cross-section of a mounting member secured to the clamping apparatus according to the present invention.
Figure 7:
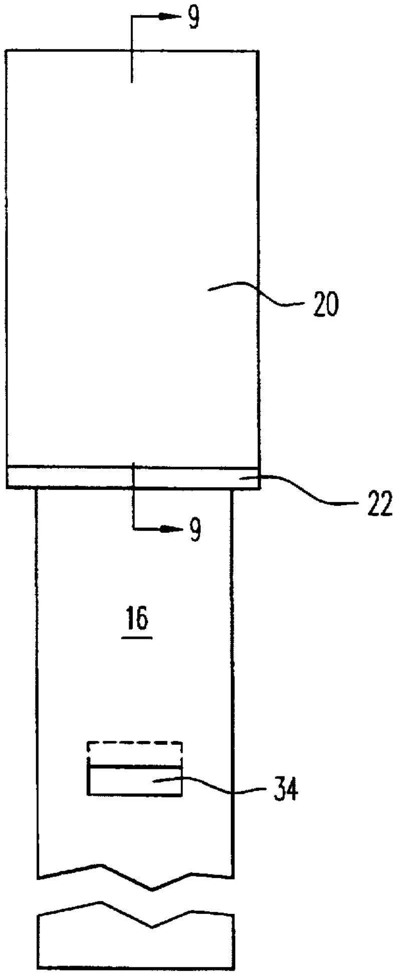
FIG. 7 shows a front elevational view of the clamping apparatus according to the present invention with the strap removed.

Referring to FIGS. 2–4 and 7, a retaining strap 28 has an engaging member comprising a hook 30 at one end and a tensioning member comprising screw 32 at a second end, each having a loop for receiving an end of the retaining strap 28. Referring to FIGS. 2 and 3, the hook 30 is arranged to engage a slot 34 in the metallic post 16. Referring to FIG. 6, during a clamping operation, the mounting member 14 can be received in the receiving member 18 and clamped therein by the strap 28.

As shown in FIGS. 3, 4 and 6, the apparatus 10 further includes a wing nut 36. The wing nut 36 is threaded onto the tensioning screw 32 which is inserted into the bore 26 of the flange 24 for clamping the mounting member 14 onto the receiving member 18. The tension in the strap 28 can be varied by rotating the wing nut 36.

Figure 10:
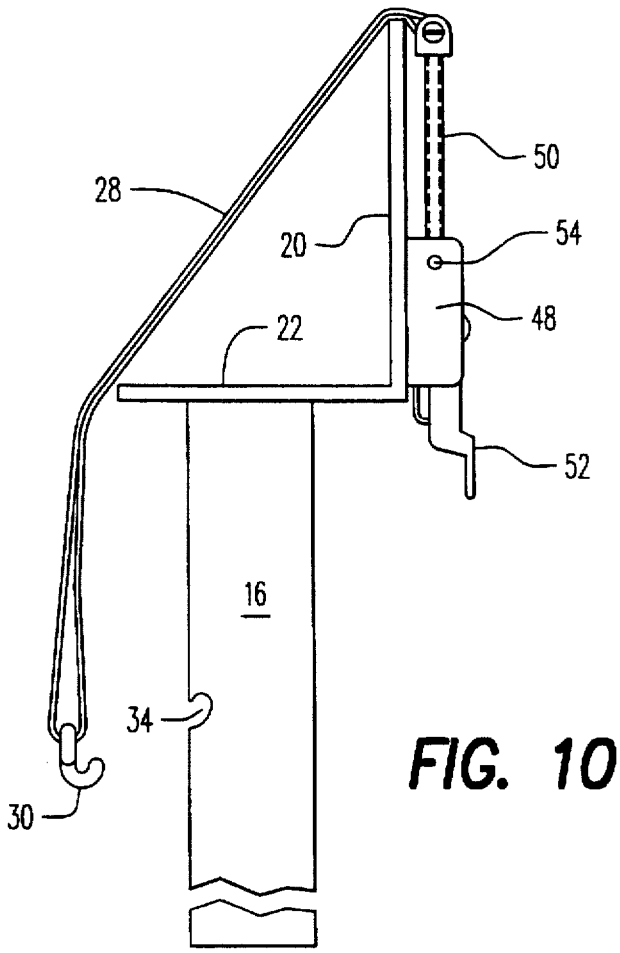
FIG. 10 shows a second embodiment of the inventive apparatus.

In another embodiment, as shown in FIG. 10, a cam-lock 48 can be substituted for the wing nut 36. The cam-lock 48 includes a screw 50 for adjusting the strap tension 28. A cam handle 52 is pivotable about a cam axis 54 for tensioning the strap 28.

Figure 8:
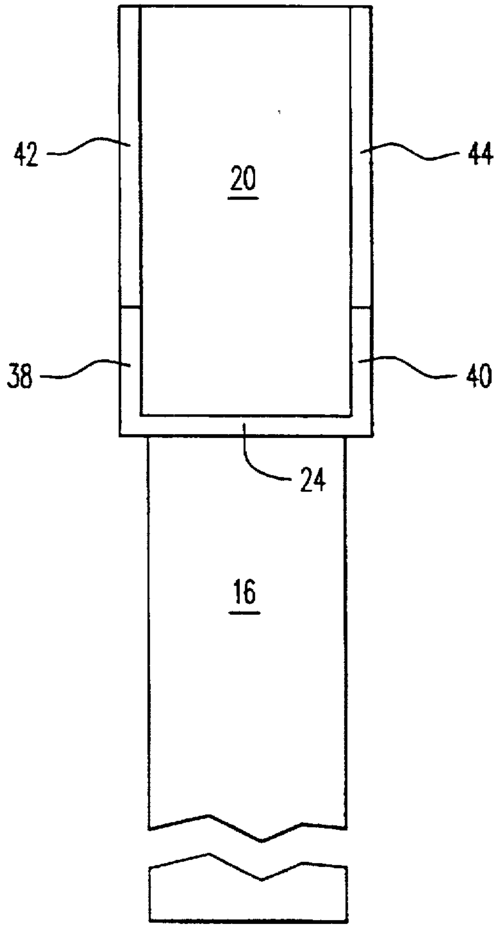
FIG. 8 shows a rear elevational view of the clamping apparatus according to the present invention with the strap removed.

As shown in FIGS. 3 and 8, the first arm 20 also has a first guide member 38 and a second guide member 40 mounted on the same side of the flange 24 for supporting the flange 24. The guide members 38 and 40 further include a first outer edge 42 and a second outer edge 44 for guiding the loop portion of the tensioning screw 32 as the strap is tensioned by tightening wing nut 36.

In sum, the use of the strap 28 in conjunction with the L-shaped receiving member 18 enables one to better secure the mounting member 14 to the receiving member 18. The positioning of the strap 28 over the mounting member 14 enables one to apply force so that the mounting member 14 is pulled against the L-shaped receiving member 18. This arrangement allows sufficient force to be applied perpendicular to the probable axis of rotation of the mounting member 14, thereby preventing undesired rotation of the pair of bongos.

Those skilled in the art will recognize that the engaging member and tensioning member of the strap 28 could be reversed such that an engaging member could engage the side of the first arm 20 away from the receiving surface and the tensioning member could engage a bore on an extension of the second arm 22.

While there have been described what are believed to be the preferred embodiments of the invention, those skilled in the art will recognize that other and further changes may be made thereto without departing from the spirit of the invention, and it is intended to claim all such changes and modifications as fall within the true scope of the invention.

I claim:

1. An apparatus for clamping a musical instrument having a mounting member with a generally rectangular cross-section to a metallic mounting post, comprising:
   - a receiving member attached to said metallic mounting post, said receiving member having a first receiving surface and a second receiving surface intersecting virtually at a right angle to form an L-shape;
   - a retaining strap arranged to detachably clamp said mounting member to said receiving member, said retaining strap including a detachable engaging member at one end thereof and a tensioning member at the other end thereof; and
   - means for attaching said retaining strap to said receiving member.

2. The apparatus as specified in claim 1 wherein said tensioning member comprises a screw, and wherein said receiving member includes an extending flange having a bore for receiving said screw.

3. The apparatus as specified in claim 1, wherein said tensioning member comprises a cam-lock and an adjusting screw for adjusting tension applied by said cam lock.

4. The apparatus as specified in claim 1, wherein rubber sheeting is disposed on the L-shaped receiving member for improving frictional engagement between said apparatus and said musical instrument.

5. An apparatus for clamping a musical instrument having a generally rectangular cross-section mounting member, comprising:

a metallic post;

an L-shaped receiving member rigidly attached to said metallic post and having first and second arms;

a flange extending outward from said receiving member and having a bore therethrough;

and a strap having a hook at one end and a tensioning screw at a second end, said hook being arranged to engage said metallic post, and said tensioning screw being arranged to be retained by said bore whereby said mounting member can be received in said receiving member and clamped therein by said strap.

6. The apparatus of claim 5 wherein said metallic post is provided with a slot for receiving said hook.

7. The apparatus of claim 5, wherein a wing nut is threaded onto said tensioning screw for clamping said mounting member onto said receiving member.

8. The apparatus of claim 7, wherein the tension of the strap can be varied by rotating said wing nut.

9. The apparatus of claim 5, wherein said first arm further comprises first and second guide members mounted on the same side of said flange for supporting the flange.

10. The apparatus of claim 9, wherein said first and second guide members are mounted for stiffening said first arm.

11. The apparatus of claim 9, wherein said guide members further include outer edges for guiding a portion of said tensioning screw.

12. The apparatus of claim 5, wherein rubber sheeting is disposed on said L-shaped receiving member for improving frictional engagement between said apparatus and said musical instrument.

13. An apparatus for clamping a musical instrument having a generally rectangular cross-section mounting member, comprising:

a metallic post;

a L-shaped receiving member secured to said metallic post and having a first arm and a second arm, said receiving member having a flange with a bore therethrough; and a strap having a hook at one end and a tensioning member at a second end, said hook being arranged to engage said metallic post, said tensioning member being adapted to engage said bore, whereby said mounting member can be received in said receiving member and clamped therein by said strap.

* * * * *